US009612480B2

(12) United States Patent
Rossini et al.

(10) Patent No.: US 9,612,480 B2
(45) Date of Patent: Apr. 4, 2017

(54) METHOD OF PRODUCING A PHASE DEVICE BASED ON A TWISTED LIQUID CRYSTAL HAVING OPTIMIZED STRUCTURE OPERATING UNDER UNPOLARIZED LIGHT

(75) Inventors: Umberto Rossini, Coublevie (FR); Laurence Clerc, Brie et Angonnes (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/239,252

(22) PCT Filed: Jul. 19, 2012

(86) PCT No.: PCT/EP2012/064184
§ 371 (c)(1),
(2), (4) Date: Feb. 17, 2014

(87) PCT Pub. No.: WO2013/023869
PCT Pub. Date: Feb. 21, 2013

(65) Prior Publication Data
US 2014/0218672 A1 Aug. 7, 2014

(30) Foreign Application Priority Data
Aug. 18, 2011 (FR) .................. 11 57408

(51) Int. Cl.
*G02F 1/1335* (2006.01)
*G02F 1/1337* (2006.01)
(Continued)

(52) U.S. Cl.
CPC ......... *G02F 1/133784* (2013.01); *G02B 3/14* (2013.01); *G02B 5/1876* (2013.01); *G02F 1/1397* (2013.01); *G02F 2001/294* (2013.01)

(58) Field of Classification Search
CPC ............ G02F 1/133784; G02F 1/1397; G02F 2001/294; G02B 3/14; G02B 5/1876
(Continued)

(56) References Cited

U.S. PATENT DOCUMENTS 5,579,142 A * 11/1996 Sawayama .......... G02F 1/13725
349/113
2003/0011740 A1* 1/2003 Tanaka .............. G02F 1/133753
349/177
(Continued)

FOREIGN PATENT DOCUMENTS

| FR | 2957429 B1 | 9/2011 |
| JP | 2007-73088 A | 3/2007 |
| WO | 2008091896 A2 | 7/2008 |

OTHER PUBLICATIONS

Yi-Hsin Lin, et al., "Polarization-Independent Liquid Crystal Phase Modulator using a Thin Polymer-Separated Double-Layered Structure", Optics Express, Oct. 31, 2005, pp. 8746-8752, vol. 13, No. 22.
(Continued)

*Primary Examiner* — Charles Chang
(74) *Attorney, Agent, or Firm* — Baker Hostetler LLP

(57) ABSTRACT

The invention relates to a method of producing a phase device operating at at least one wavelength ($\lambda$) comprising a cell containing a liquid crystal possessing a helical structure, inserted between two alignment layers possessing rubbing axes and means for applying a voltage to said cell, said helical structure exhibits a number of helical turns k, said liquid crystal exhibiting a defined angle of twist $\Theta$ between the rubbing axes of the two alignment layers, characterized in that it comprises the following steps: —the determination of a compensation angle $\epsilon$ satisfying the following equation: (formula) with: N the integer closest to (formula) the angle of twist $\Theta=2K\pi-\epsilon\Delta n$: the birefringence
(Continued)

(a)

(b)

(c)

of the liquid crystal; d: the thickness of the liquid crystal cell; λ: the wavelength of the light beam which passes through the liquid crystal cell; the rubbing of one of the faces in a direction of alignment of said liquid crystal molecules, defining the angle of twist: $\theta = 2K\pi - \epsilon$.

$$\varepsilon = \frac{2k\pi - N\pi\sqrt{1 - \frac{d^2\Delta n^2}{N^2\lambda^2}}}{2k\sqrt{\left(1 + \frac{d^2\Delta n^2}{4k^2\lambda^2}\right)}}$$

4 Claims, 6 Drawing Sheets

(51) Int. Cl.
    *G02F 1/139*     (2006.01)
    *G02B 3/14*     (2006.01)
    *G02B 5/18*     (2006.01)
    *G02F 1/29*     (2006.01)

(58) Field of Classification Search
    USPC .......................................................... 349/15
    See application file for complete search history.

(56) References Cited

U.S. PATENT DOCUMENTS

2004/0239851 A1\* 12/2004 Tsukagoshi ....... G02F 1/133385
                                                          349/117
2011/0228181 A1\* 9/2011 Jeong ................... G02B 5/1842
                                                          349/15
2012/0327356 A1 12/2012 Rossini et al.

OTHER PUBLICATIONS

Yue Zhao, et al., "Liquid-Crystal Imaging of Molecular-Tilt Ordering in Self-Assembled Lipid Tubules", PNAS, May 24, 2005, pp. 7438-7442, vol. 102, No. 21.

Gordon D. Love, "Liquid-Crystal Phase Modulator for Unpolarized Light", Applied Optics, May 1, 1993, pp. 2222-2223, vol. 32, No. 13.

Refusing Reason Notice issued in JP Patent Application No. 2014-525371 mailed Dec. 22, 2015.

\* cited by examiner

METHOD OF PRODUCING A PHASE DEVICE BASED ON A TWISTED LIQUID CRYSTAL HAVING OPTIMIZED STRUCTURE OPERATING UNDER UNPOLARIZED LIGHT

CROSS-REFERENCE TO RELATED APPLICATIONS

This application is a National Stage of International patent application PCT/EP2012/064184, filed on Jul. 19, 2012, which claims priority to foreign French patent application No. FR 1157408, filed on Aug. 18, 2011, the disclosures of which are incorporated by reference in their entirety.

FIELD OF THE INVENTION

The field of the invention is that of electro-optical phase devices based on a liquid crystal of the twisted nematic or cholesteric type and having applications in fields such as that of wavefront correctors or lenses, and notably lenses with a kinoform profile.

BACKGROUND

Such devices, intended to be able to operate with unpolarized light, have already been described in the literature. Notably, the patent application WO 2008/091896 may be mentioned, which describes a lens consisting of an electrode with a kinoform profile for forming a cell which is filled with a cholesteric liquid crystal, or the French patent FR 10 01114, describing a phase modulator based on a liquid crystal with a helical structure.

In general, one of the main characteristics of liquid-crystal cells is the fact that it is possible to change the optical index of the medium by applying an electric field. Specifically, the liquid-crystal molecules, notably nematic molecules, have an ordinary optical axis and an extraordinary optical axis. These molecules can be orientated under the action of an applied electric field, the three positions (a), (b) and (c) represented in FIG. 1 respectively relating to a weak field (less than the field necessary to be able to start to orientate the molecules), a medium field and a strong field.

By changing the orientation of said molecules, the average optical index experienced by a light beam passing through the medium can thus be varied. It is possible to use a non-twisted nematic with positive or negative dielectric anisotropy integrated into a cell, more precisely having an entry polarizer and two substrates, one of which, by virtue of a prior surface condition, makes it possible to constrain the molecules in an initial state.

Such a device operates with polarized light and, as the field increases, the liquid-crystal molecules straighten and the light experiences an index intermediate between the ordinary and extraordinary indices.

In order to modify the phase of unpolarized light, it is necessary to carry out this phase-shifting operation on the two components of the electric field, to which end it is possible to superpose two devices, as described in the article: Polarization-independent liquid crystal phase modulator using a thin polymer-separated double-layered structure, Yi-Hsin Lin, Hongwen Ren, Yung Hsun Wu, Zhibing Ge and Shin-Tson Wu: *College of Optics and Photonics*, University of Central Florida, Orlando, Fla. 32816 and Yue Zhao and Jiyu Fang: *Advanced Materials Processing and Analysis Center and Department of Mechanical, Materials*, or to use a quarter-wave plate and a mirror and thereby make the light pass two times through the same device, thus acting on the two components of the electric field as described in the article: Liquid-crystal phase modulator for unpolarized light by Gordon D. Love *APPLIED OPTICS/Vol.* 32, No. 13/1 May 1993.

In the first case, the superposition poses significant parallax problems and therefore does not permit superposition of matrices having small pixels. In the second case, the use of a reflector in the optical path makes it a reflection device, which therefore cannot be integrated into conventional optics (zoom optics for an imager, for example).

Liquid-crystal cells of the twisted nematic or cholesteric type, in which the molecules are not arranged exactly parallel to one another but adopt a helical configuration, are furthermore known. If a section of the structure is taken in a plane perpendicular to the z axis of the spiral, the distortion of the molecules in the plane is similar to that of a nematic but the privileged orientation direction of the molecules turns slowly when moving along the z axis. A periodic helical structure along the z direction perpendicular to the plane of the layers is thus obtained. Depending on the illumination wavelength and the pitch of the helix, such structures may behave partially as a mirror if the following condition is satisfied: $p=\lambda/n$ with $\lambda$ being the wavelength of the wave and n being the average index of the liquid-crystal medium.

In general, in order to obtain a liquid-crystal cell of the twisted nematic TN or cholesteric type, it is conventional to use two transparent substrates assembled to form a cavity between them, in which the liquid-crystal molecules are incorporated.

The rubbing operations known to the person skilled in the art, which are carried out on the two substrates, and the assembly of the latter are such that there is a so-called twist angle between the rubbing axes of the two alignment layers. For example, this twist angle may be 90°. It may also be less, for example 80°, or more, for example 280°, typically for so-called super-twisted nematics STN.

In general, liquid crystals of the cholesteric type become orientated spontaneously in a privileged direction n in space, which is called the director. When an electric field applies constraints in a certain orientation, the molecules tend to return to this state in response to a deformation.

In the context of a phase device, when light passes through these cholesteric liquid crystals in the OFF state, if the pitch of the liquid crystal is rapid enough, the latter has only a low rotating power on the light which then "sees" an average index known to be approximately $n_o+\frac{1}{2}\Delta n$, where $n_o$ is the ordinary index of the liquid crystal and $\Delta n$ is the difference between the extraordinary and ordinary indices $(n_e-n_o)$.

Moreover, for an arbitrary liquid-crystal thickness and a given pitch of the cholesteric, further to the low rotating power there is a change in the ellipticity of the light which passes through the device.

For example, linearly polarized light passing through the device is slightly elliptical when it leaves the device, the degree of ellipticity depending on the azimuth between the entry director of the liquid crystal, the direction of the polarization upon entry and also the wavelength.

This ellipticity could have been obtained in the same way by passing through a simple birefringent plate placed at 45° to the polarization in question: the cholesteric liquid crystal is then referred to as having a residual birefringence, the value of this birefringence being that of the equivalent plate defined above.

SUMMARY OF THE INVENTION

In this context, it is an object of the present invention to provide a method of producing a phase device based on a liquid crystal, having an optimized structure making it possible to compensate for this residual birefringence.

More precisely, the present invention relates to a method of producing a phase device operating at least at one wavelength ($\lambda$), comprising a cell containing a liquid crystal which has a helical structure and is inserted between two alignment layers having rubbing axes, and means for applying a voltage to said cell, said helical structure having a number of helix turns k, and said crystal having a twist angle $\theta$ defined between the rubbing axes of the two alignment layers, characterized in that it comprises the following steps:

determining a compensation angle $\epsilon$ satisfying the following equation:

$$\varepsilon = 2k\pi - N\pi\sqrt{1 - \frac{d^2 \Delta n^2}{N^2 \lambda^2}}$$

with:

N the integer closest to $$2k\sqrt{\left(1 + \frac{d^2 \Delta n^2}{4k^2\lambda^2}\right)}$$

the twist angle $\theta = 2k\pi - \epsilon$ $\Delta n$: the birefringence of the liquid crystal;

d: the thickness of the liquid-crystal cell;

$\lambda$: the wavelength of the light beam which passes through the liquid-crystal cell;

rubbing one of the faces along an alignment direction of said liquid-crystal molecules, defining the twist angle: $\theta = 2k\pi - \epsilon$.

According to one variant of the invention, the phase device is a lens.

According to one variant of the invention, the lens is a lens with a kinoform profile.

According to one variant of the invention, the method operates at least in the wavelength band [400 nm, 700 nm], the calculation of the compensation angle $\epsilon$ being carried out at a wavelength close to 475 nm.

BRIEF DESCRIPTION OF THE DRAWINGS

The invention will be better understood, and other advantages will become apparent, on reading the following description which is given without implying any limitation, and by virtue of the appended figures in which.

DETAILED DESCRIPTION

The Applicant has assumed that the action of an oblong liquid-crystal molecule, twisted by an angle $\theta$, on polarized light can be represented on the Poincaré sphere as that:

of an elliptical birefringent with coordinates X and Z defined below:

$$X = \frac{\frac{2\pi \Delta n}{\lambda}}{\sqrt{\left(\frac{2\pi \Delta n}{\lambda}\right)^2 + \frac{4\theta^2}{d^2}}}$$

$$Z = \frac{\frac{2\theta}{d}}{\sqrt{\left(\frac{2\pi \Delta n}{\lambda}\right)^2 + \frac{4\theta^2}{d^2}}},$$

the rotation amplitude of the elliptical birefringent being defined as follows:

$$Amp = d\sqrt{\left(\frac{2\pi \Delta n}{\lambda}\right)^2 + \frac{4\theta^2}{d^2}}$$

with:

n: index of the crystal $\theta$: twist angle d: thickness of the liquid-crystal cell $\lambda$: the wavelength of the light beam which passes through the liquid-crystal cell;

followed by a rotation dependent on the total twist.

Figure 1:
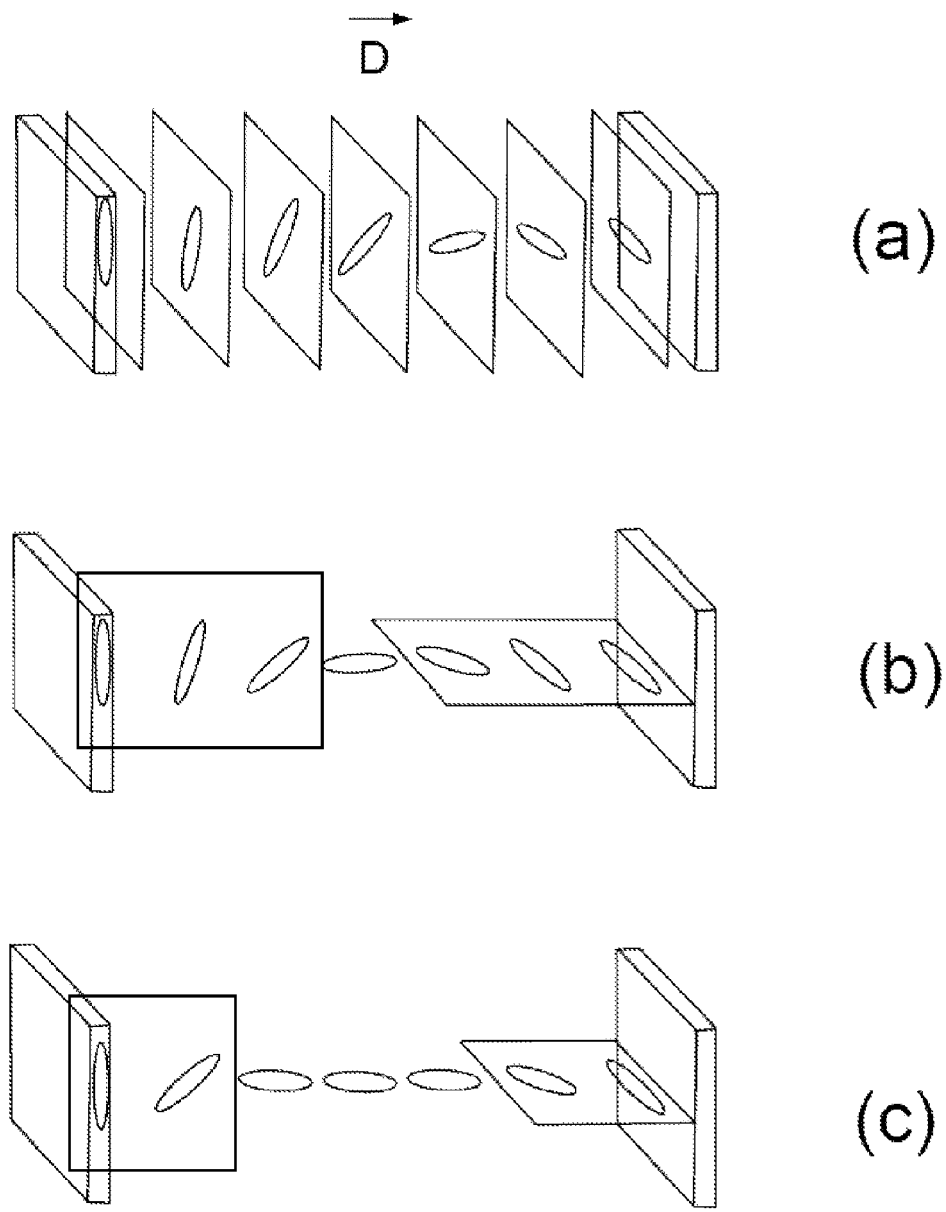
FIG. 1a-1c schematizes the orientation of liquid-crystal molecules under the action of an electric field.
Figure 2A:
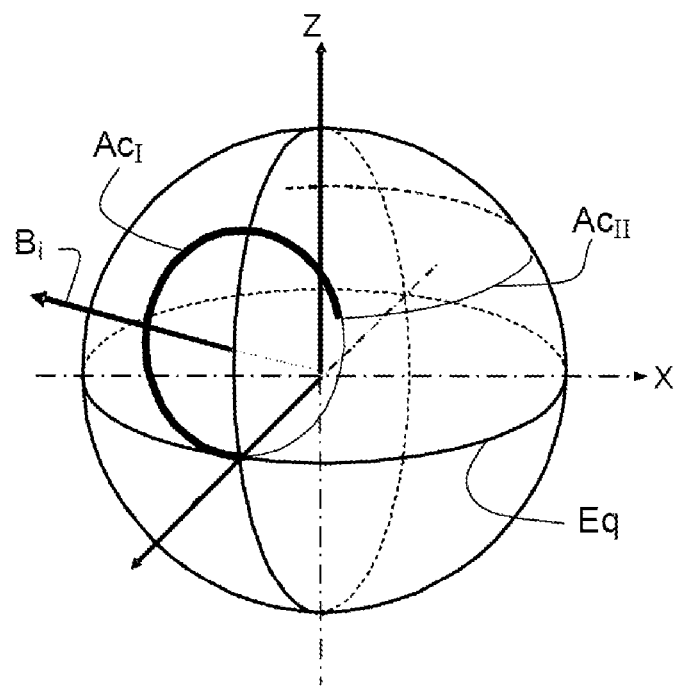
FIGS. 2a, 2b and 2c illustrate the cumulative and separate phenomena of the action of polarized light on a twisted liquid crystal.
Figure 2B:
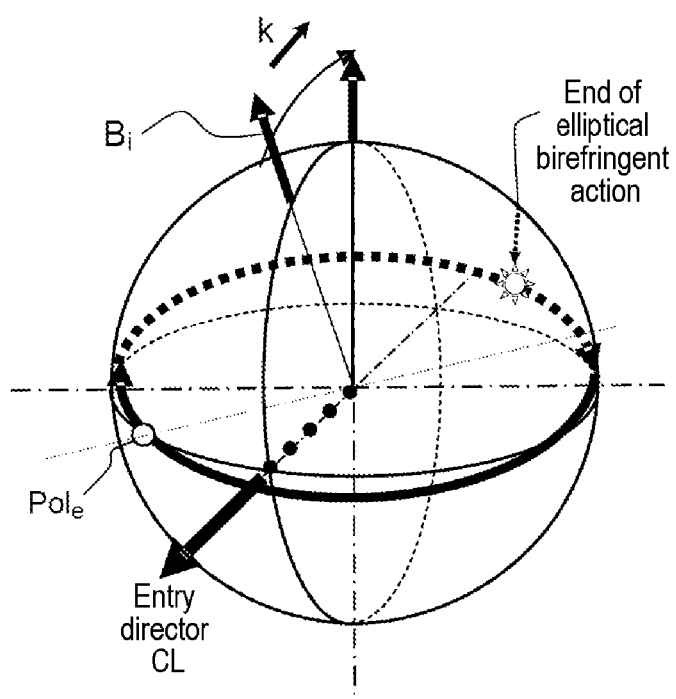
Figure 2C:
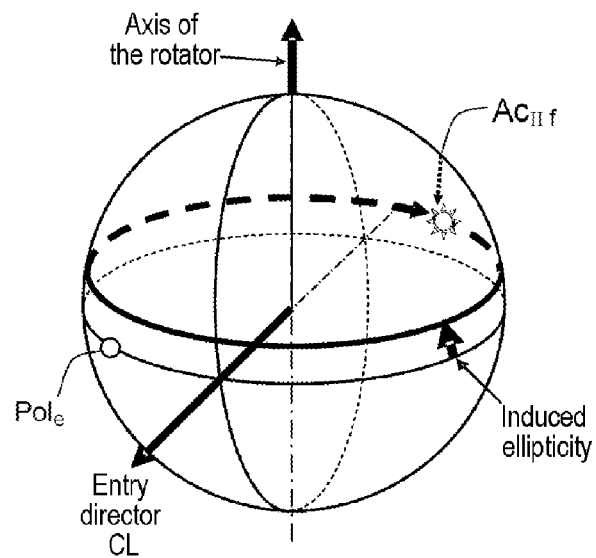

FIGS. 2a, 2b and 2c illustrate the two phenomena cumulatively and separately.

FIG. 2b demonstrates notably the entry polarization $Pol_e$ of the beam at $\lambda$, as well as the entry birefringent, showing the entry director CL. The phenomenon can thus be broken down into a first action (that of the birefringent Bi) which takes a point on the equator Eq and puts it somewhere on the Poincaré sphere in order to make it into elliptical light, the second action being the rotation associated with the total twist, said actions being schematized by the references $Ac_I$ and $AC_{II}$, $ACI_{If}$ indicating the end of the rotation action.

Figure 3:
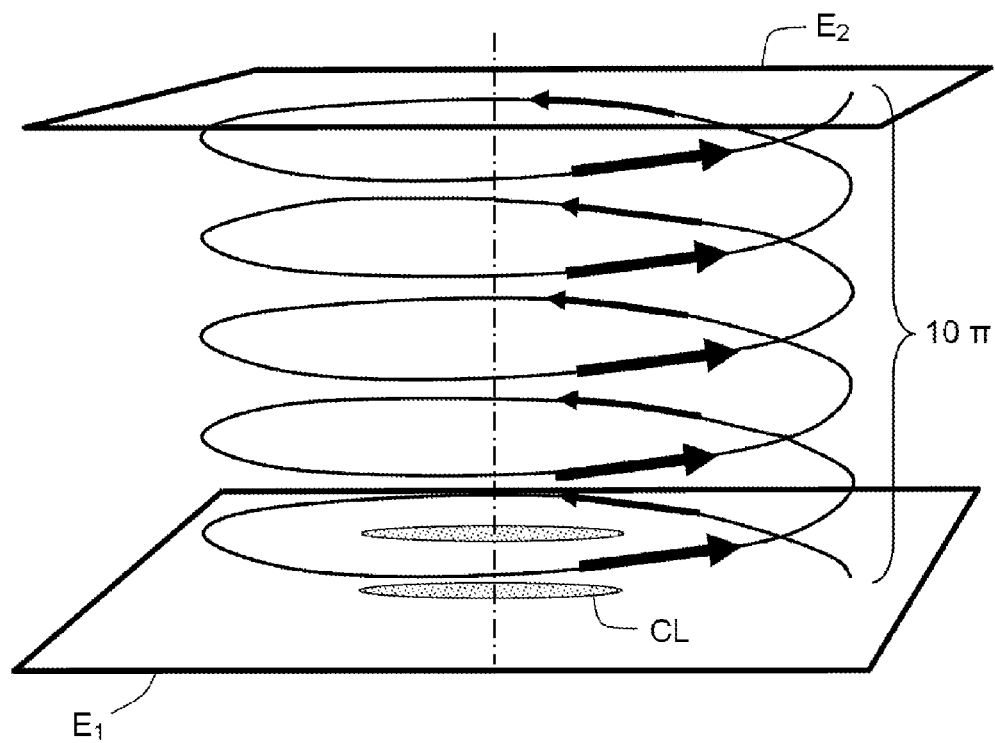
FIG. 3 illustrates the cholesteric molecules along a helix in a liquid-crystal device and the polarization of the light along the thickness of said cell.

It can thus be seen that, with $\theta = 2\pi k$ and k being the number of cholesteric turns, the greater k is, the more the axis of the elliptical birefringent is positioned vertically (as shown by the change in FIG. 2b in the axis of the birefringent as a function of the number k). In parallel, FIG. 3 illustrates the number of helix turns within a liquid-crystal cell inserted between two electrodes $E_1$ and $E_2$, the faces of which are treated in order to impart a twist angle, in the example in which k is equal to 5.

Figure 4:
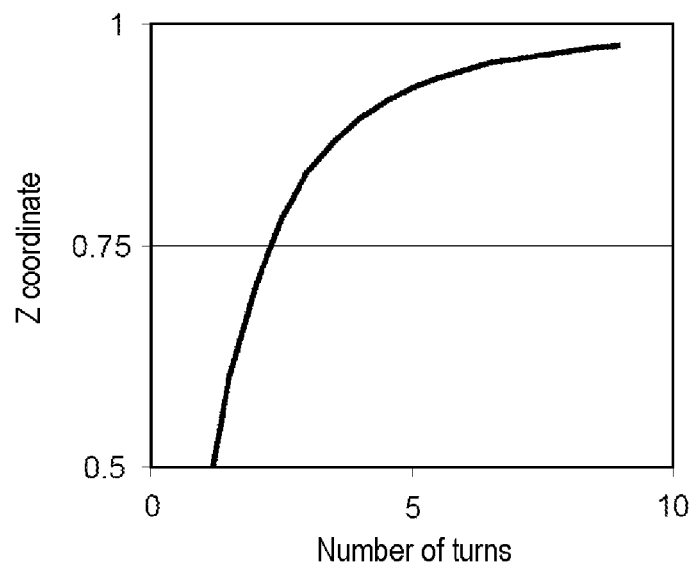
FIG. 4 illustrates the change in the Z coordinate as a function of the number of turns for a liquid-crystal cell having a thickness d equal to 5.1 µm and an index variation $\Delta n=0.2139$, and for light with a wavelength of $\lambda=0.55$ µm.

By way of indication, FIG. 4 shows the change in the Z coordinate as a function of the number of turns for a liquid-crystal cell having a thickness d equal to 5.1 µm and an index variation $\Delta n=0.2139$, and for light with a wavelength $\lambda=0.55$ µm. When the number of turns is large enough, the coordinate tends to Z=1, an indication of a vertical birefringent axis and a zero induced ellipticity.

By greatly increasing the number of turns of the cholesteric, it is therefore possible to tend to suppress the ellipticity by tending to obtain a linear polarization, although in this case it becomes necessary to apply a higher and higher control voltage.

In this context, the Applicant has ascertained that, when the Poincaré sphere and the action of the elliptical birefringent on the light are observed, it is seen that if the rotation amplitude is a multiple of $2\pi$, i.e. Amp=$2\pi N$, any linear polarization returns to the equator after action of the birefringent.

This is expressed mathematically by the following equation:

$$\theta = \pi\sqrt{N^2 - \frac{d^2 \Delta n^2}{\lambda^2}} = 2k\pi - \varepsilon,$$

which means both that the amplitude of the birefringent is equal to $2N\pi$ but also that the angle $\theta$ must approach $2k\pi$ as closely as possible while remaining less than $2k\pi$, $$\text{i.e.:} \quad \frac{\varepsilon}{\pi} = 2k - \sqrt{N^2 - \frac{d^2 \Delta n^2}{\lambda^2}},$$

with N being an integer and $\varepsilon$ being the compensation angle: a decreasing function of the number N.

$\varepsilon$ is a minimum when the integer N is close to $$2k\sqrt{\left(1 + \frac{d^2 \Delta n^2}{4k^2 \lambda^2}\right)}.$$

It is thus possible to determine the angle $\varepsilon$ such that:

$$\varepsilon = 2k\pi - N\pi\sqrt{1 - \frac{d^2 \Delta n^2}{N^2 \lambda^2}},$$

with N the closest integer to $$2k\sqrt{\left(1 + \frac{d^2 \Delta n^2}{4k^2 \lambda^2}\right)},$$

$\varepsilon$ corresponding to the compensation angle which must be provided so that the twist is equal to $2k\pi-\varepsilon$ and the residual ellipticity is thus eliminated.

Specifically, the light passing through the cholesteric experiences a residual rotational effect: thus, if the intention is to start with polarized light at the entry and obtain polarized light at the exit, it is found that the rotation of the birefringent is more than $2\theta$, and it is therefore expedient to impart a slightly lower twist angle so that this amplitude exactly constitutes an integer times $2\pi$.

This means that the angle $\theta$ should be equal to $2k\pi-\varepsilon$ in order to obtain the condition: Amp=$2\pi N$, and that the smallest value of $\varepsilon$ is obtained for N=2k.

In general, the ellipticity generated on a light beam depends on the thickness of the liquid-crystal cell and on the helix pitch of the liquid crystal as a function of the twist angle.

Furthermore, as already mentioned, depending on the illumination wavelength and the pitch of the helix, such structures may behave partially as a mirror if the following condition is satisfied: $p=\lambda/n$ with $\lambda$ being the wavelength of the wave and n being the index of the liquid-crystal medium.

In the case of a device designed to operate in transmission, this means that the pitch of the helix should not correspond to a wavelength such that a Bragg mirror is formed. Thus, cell thickness conditions and a number of helix turns k intended to lie outside these conditions are selected. Typically, for a device which is to operate in the visible range, conditions such that the reflection takes place in the infrared range rather than in the ultraviolet range are preferably selected.

Figure 5:
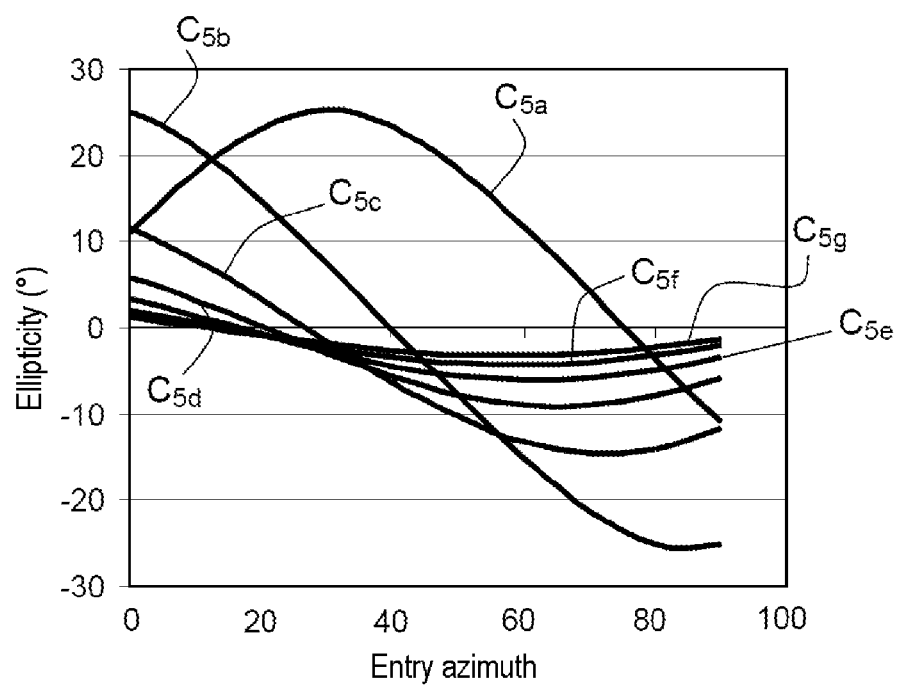
FIG. 5 illustrates the change in the ellipticity as a function of the entry azimuth angle for cells whose thickness is constant and whose helix pitch is variable.
Figure 6:
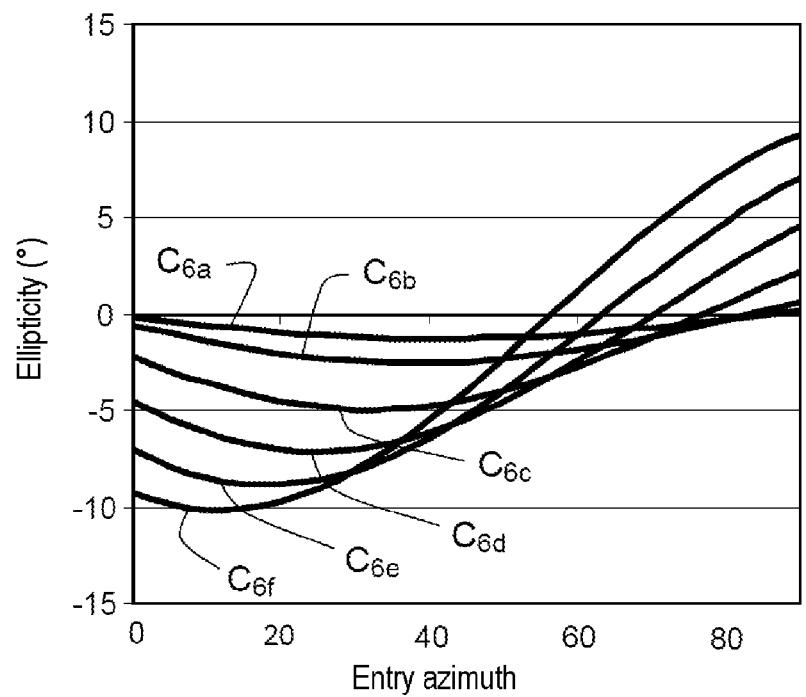
FIG. 6 illustrates the change in the ellipticity as a function of the entry azimuth angle for cells whose helix pitch is constant and whose thickness is variable.

By way of example, FIGS. 5 and 6 illustrate the change in the ellipticity as a function of the entry azimuth angle for cells respectively:
- whose thickness is constant and whose number of helix turns is variable (curve $C_{5a}$ for $2\pi$, curve $C_{5b}$ for $4\pi$, curve $C_{5c}$ for $6\pi$, curve $C_{5d}$ for $8\pi$, curve $C_{5e}$ for $10\pi$, curve $C_{5f}$ for $12\pi$ and curve $C_{5g}$ for $14\pi$);
- whose helix pitch is constant and whose thickness is variable (curve $C_{6a}$ for 1 µm, curve $C_{6b}$ for 2 µm, curve $C_{6c}$ for 4 µm, curve $C_{6d}$ for 6 µm, curve $C_{6e}$ for 8 µm, curve $C_{6f}$ for 10 µm).

The response time also increases as a function of the square of the thickness of the cell. An example of a satisfactory compromise can be achieved with a liquid crystal having an index variation $\Delta n$ of the order of 0.2 and a cell thickness of the order of 5 µm and a pitch of 0.71 µm. A pitch of 0.83 µm may also be selected, which contributes to a reduction of the control voltage by increasing the induced ellipticity.

Example of a Lens with a Kinoform Profile According to the Invention:

According to this example, the lens operating in the visible range comprises a layer of liquid crystal referenced MCL2062 from the company Merck, inserted between two control electrodes on which surface treatments for alignment have been carried out. The thickness of the liquid-crystal layer is selected so that the optical path variation experienced by the light in the kinoform lens is $2\pi$ at the wavelength in question. Typically, this thickness is therefore equal to $0.55/(0.5 \Delta n)$ for a wavelength of 0.55 µm.

It can be seen from the equations above, corresponding to a liquid-crystal cell having 3 helix turns, that a compensation angle $\varepsilon=61°$ can be found which makes it possible to cancel the residual ellipticity, this compensation angle being applied during the antiparallel rubbing treatment.

Likewise, for a liquid-crystal cell having a number of helix turns equal to 5, a compensation angle $\varepsilon=36°$ can be determined.

According to the method of the present invention, the surface treatments conventionally carried out by antiparallel rubbing between the two surfaces are corrected by the angle $\varepsilon$ determined beforehand in this way.

Figure 7:
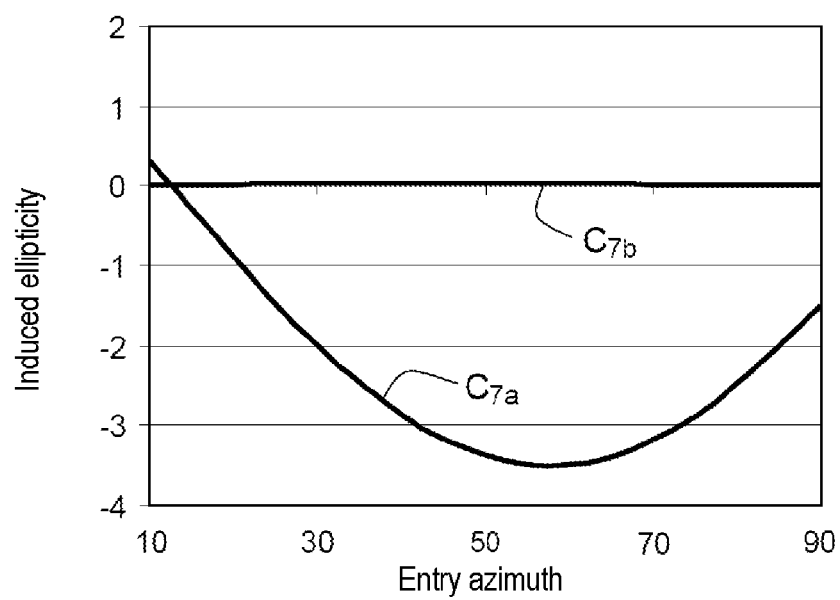
FIG. 7 in turn illustrates, in the scope of a liquid-crystal cell having 7 helix turns, the residual ellipticity with an antiparallel treatment as a function of the entry azimuth angle and the residual ellipticity obtained with the method of the invention.

In the context of a liquid-crystal cell having 7 turns, FIG. 7 illustrates the residual ellipticity with an antiparallel treatment as a function of the entry azimuth angle (curve 7a) and the residual ellipticity obtained with the method of the invention (curve 7b) thus reduced to zero.

The device of the present invention may also be operational in a wavelength range and not just at a single wavelength.

To this end, the Applicant has studied the way in which the residual birefringence varies at wavelengths other than the one for which the optimization to cancel the residual ellipticity is carried out.

Figure 8:
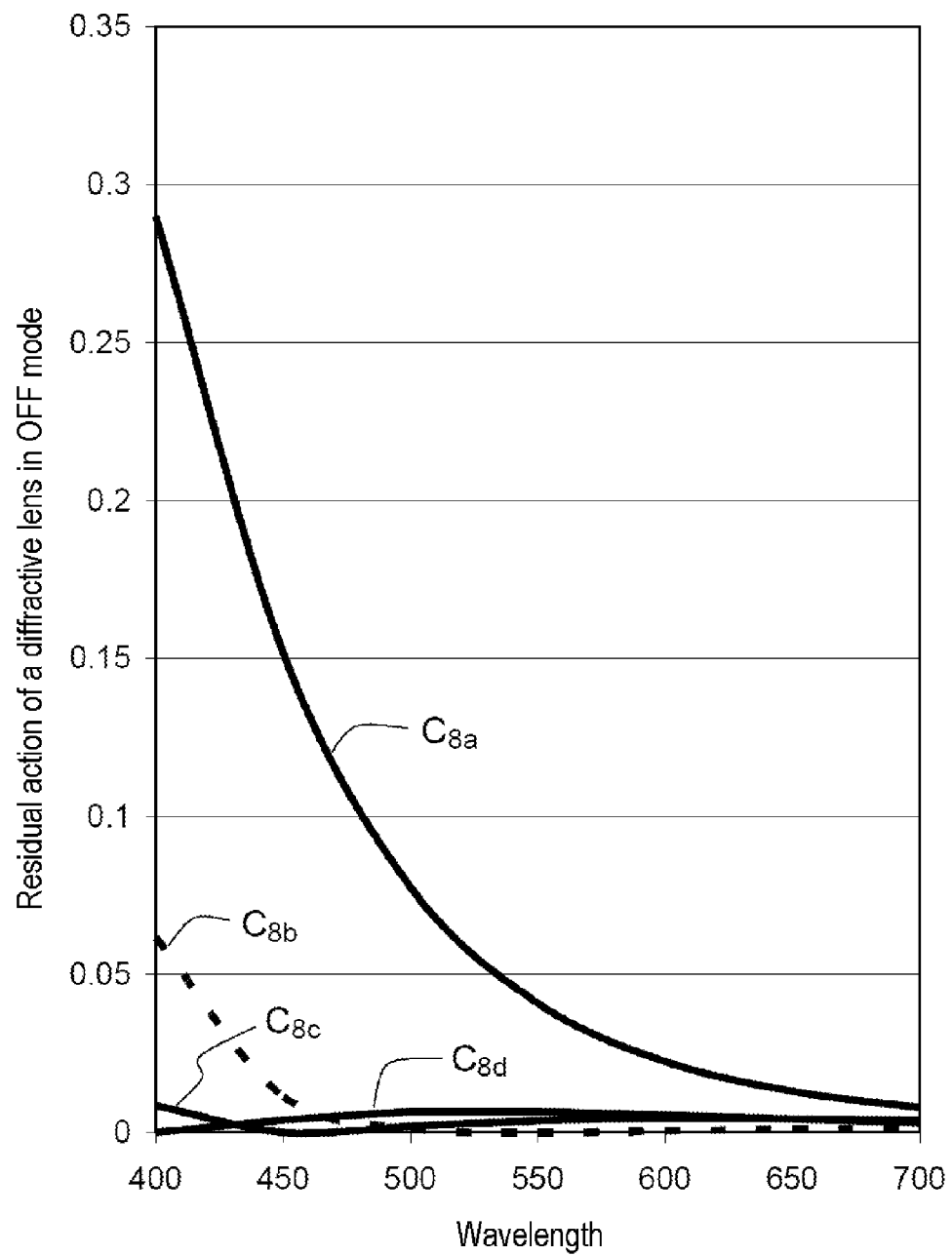
FIG. 8 illustrates the residual ellipticities at different wavelengths.

In the case of a diffractive lens with a kinoform profile, for which zero action is desired in the OFF mode and zero birefringence is desired in the OFF mode (with the same liquid-crystal parameters as mentioned above) and 7 full turns for the cholesteric, a residual action as represented in the graph illustrated in FIG. 8 is obtained. Curve $C_{8a}$ relates to a conventional surface treatment, curve $C_{8b}$ relates to an optimization carried out at a wavelength of 550 nm, curve $C_{8c}$ relates to an optimization carried out at a wavelength of 450 nm, and curve $C_{6d}$ relates to an optimization carried out at a wavelength of 400 nm.

It can be seen that, in the case of optimization calculated for 450 nm, a considerable improvement is obtained throughout the entire spectrum compared with a nonoptimized device. Typically, this represents a 38° correction on the rubbing direction of the alignment layer (still with the aforementioned liquid-crystal parameters).

The invention claimed is:

1. A method of producing a phase device operating at least at one wavelength ($\lambda$), the phase device including a cell containing a liquid crystal which has a helical structure and is inserted between two alignment layers each having rubbing axes, and means for applying a voltage to said cell, said helical structure having a number of helix turns k, and said liquid crystal having a twist angle $\theta$ defined between the rubbing axes of the two alignment layers, the method comprising the following steps:

determining a compensation angle $\epsilon$ satisfying the following equation:

$$\varepsilon = 2k\pi - N\pi\sqrt{\left(1 - \frac{d^2\Delta n^2}{N^2\lambda^2}\right)}$$

with:
N the integer closest to $$2k\sqrt{\left(1 + \frac{d^2\Delta n^2}{4k^2\lambda^2}\right)},$$

said compensation angle $\epsilon$ being an angle for minimizing a residual ellipticity of the liquid crystal and making a rotation amplitude of the light beam which passes through the liquid crystal to be equal to an integer multiple of $2\pi$;

determining the twist angle $\theta = 2k\pi - \epsilon$ based upon the compensation angle $\epsilon$;

where $\Delta n$: the birefringence of the liquid crystal;
d: the thickness of the liquid-crystal cell;
$\lambda$: the wavelength of the light beam which passes through the liquid-crystal cell; and rubbing one of the faces along an alignment direction of said liquid-crystal molecules based upon the twist angle: $\theta = 2k\pi - \epsilon$.

2. The method of producing a phase device as claimed in claim 1, wherein the phase device is a lens.

3. The method of producing a phase device as claimed in claim 2, wherein the lens is a lens with a kinoform profile.

4. The method of producing a phase device as claimed in claim 1, operating at least in the wavelength band from 400 nm to 700 nm, the calculation of the compensation angle $\epsilon$ being carried out at a wavelength close to 475 nm.

* * * * *